(12) United States Patent
Tang et al.

(10) Patent No.: US 10,519,663 B2
(45) Date of Patent: *Dec. 31, 2019

(54) PEEL AND STICK ROOFING MEMBRANES WITH CURED PRESSURE-SENSITIVE ADHESIVES

(71) Applicant: FIRESTONE BUILDING PRODUCTS CO., LLC, Nashville, TN (US)

(72) Inventors: Jiansheng Tang, Westfield, IN (US); Michael J. Hubbard, Anderson, IN (US)

(73) Assignee: Firestone Building Products Company, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/179,084

(22) Filed: Nov. 2, 2018

(65) Prior Publication Data

US 2019/0071872 A1 Mar. 7, 2019

Related U.S. Application Data

(60) Continuation of application No. 15/398,868, filed on Jan. 5, 2017, which is a division of application No. (Continued)

(51) Int. Cl.
*E04D 5/14* (2006.01)
*B32B 7/06* (2019.01)
(Continued)

(52) U.S. Cl.
CPC ............... *E04D 5/148* (2013.01); *B32B 7/06* (2013.01); *B32B 7/12* (2013.01); *B32B 25/04* (2013.01); *B32B 27/00* (2013.01); *B32B 27/308* (2013.01); *C09J 7/22* (2018.01); *C09J 7/243* (2018.01); *C09J 7/38* (2018.01); *C09J 7/385* (2018.01); *C09J 133/00* (2013.01); *E04D 5/06* (2013.01); *E04D 5/08* (2013.01); *E04D 5/10* (2013.01);
(Continued)

(58) Field of Classification Search
CPC .......................... Y10T 428/1476; E04D 5/148
USPC .......................................................... 156/332
See application file for complete search history.

(56) References Cited

U.S. PATENT DOCUMENTS 3,935,353 A 1/1976 Doerfling et al.
4,404,243 A 9/1983 Terpay
(Continued)

FOREIGN PATENT DOCUMENTS

CA 2809955 A1 5/2013
EP 0342811 B1 7/1995
(Continued)

OTHER PUBLICATIONS

International Search Report and Written Opinion for Appl. Serial No. PCT/US2014/056295 dated Dec. 5, 2014, pp. 1-10.

*Primary Examiner* — Scott W Dodds
(74) *Attorney, Agent, or Firm* — Brian D. McAlhaney; Arthur M. Reginelli

(57) ABSTRACT

A membrane composite comprising a polymeric membrane panel, an adhesive layer, and a release member, where the adhesive layer is a pressure-sensitive adhesive that is at least partially cured, and where the adhesive layer has a thickness of at least 102 μm.

17 Claims, 3 Drawing Sheets

Related U.S. Application Data

15/021,787, filed as application No. PCT/US2014/056295 on Sep. 18, 2014, now Pat. No. 10,132,082.

(60) Provisional application No. 61/983,738, filed on Apr. 24, 2014, provisional application No. 61/879,358, filed on Sep. 18, 2013.

(51) Int. Cl.

| | | |
|---|---|---|
| *B32B 7/12* | (2006.01) | |
| *B32B 25/04* | (2006.01) | |
| *B32B 27/00* | (2006.01) | |
| *B32B 27/30* | (2006.01) | |
| *C09J 7/38* | (2018.01) | |
| *C09J 7/22* | (2018.01) | |
| *C09J 7/24* | (2018.01) | |
| *C09J 133/00* | (2006.01) | |
| *E04D 5/06* | (2006.01) | |
| *E04D 5/10* | (2006.01) | |
| *E04D 5/08* | (2006.01) | |

(52) U.S. Cl.
CPC ....... *B32B 2255/10* (2013.01); *B32B 2255/26* (2013.01); *B32B 2307/748* (2013.01); *B32B 2419/06* (2013.01); *C09J 2201/606* (2013.01); *C09J 2201/61* (2013.01); *C09J 2205/10* (2013.01); *C09J 2423/166* (2013.01); *C09J 2433/00* (2013.01)

(56) References Cited

U.S. PATENT DOCUMENTS

| | | | |
|---|---|---|---|
| 4,585,682 A | | 4/1986 | Colarusso et al. |
| 4,806,400 A | * | 2/1989 | Sancaktar ............... B26D 3/02 428/35.9 |
| 4,908,229 A | | 3/1990 | Kissel |
| 4,943,461 A | | 7/1990 | Karim |
| 5,073,611 A | | 12/1991 | Rehmer et al. |
| 5,086,088 A | | 2/1992 | Kitano et al. |
| 5,128,386 A | | 7/1992 | Rehmer et al. |
| 5,242,727 A | | 9/1993 | Briddell et al. |
| 5,253,461 A | | 10/1993 | Janoski et al. |
| 5,264,533 A | | 11/1993 | Rehmer et al. |
| 5,317,035 A | | 5/1994 | Jacoby et al. |
| 5,374,477 A | | 12/1994 | Lawless et al. |
| 5,389,699 A | | 2/1995 | Rehmer et al. |
| 5,456,785 A | | 10/1995 | Venable |
| 5,496,615 A | | 3/1996 | Bartlett et al. |
| 5,686,179 A | | 11/1997 | Cotsakis |
| 5,880,241 A | | 3/1999 | Brookhart et al. |
| 5,895,301 A | | 4/1999 | Porter et al. |
| 6,080,818 A | | 6/2000 | Thakker et al. |
| 6,184,496 B1 | | 2/2001 | Pearce |
| 6,218,493 B1 | | 4/2001 | Johnson et al. |
| 6,262,144 B1 | | 7/2001 | Zhao et al. |
| 6,284,360 B1 | * | 9/2001 | Johnson ............... B32B 27/08 428/317.7 |
| 6,297,324 B1 | | 10/2001 | Briddell et al. |
| 6,299,936 B1 | | 10/2001 | Reck et al. |
| 6,306,460 B1 | | 10/2001 | Reck et al. |
| 6,310,163 B1 | | 10/2001 | Brookhart et al. |
| 6,348,530 B1 | | 2/2002 | Reck et al. |
| RE37,683 E | | 4/2002 | Briddell et al. |
| 6,569,970 B2 | | 5/2003 | Reck et al. |
| 6,586,080 B1 | | 7/2003 | Heifetz |
| 6,605,662 B2 | | 8/2003 | Zhao et al. |
| 6,641,896 B2 | | 11/2003 | Fensel et al. |
| 6,683,126 B2 | | 1/2004 | Keller et al. |
| 6,720,399 B2 | | 4/2004 | Husemann |
| 6,753,079 B2 | | 6/2004 | Husemann |
| 6,776,322 B2 | | 8/2004 | Villela et al. |
| 6,794,449 B2 | | 9/2004 | Fisher |
| 6,813,866 B2 | | 11/2004 | Naipawer, III |
| 6,828,020 B2 | | 12/2004 | Fisher et al. |
| 6,831,114 B2 | | 12/2004 | Husemann |
| 6,841,608 B1 | | 1/2005 | Dreher et al. |
| 6,858,315 B2 | | 2/2005 | Khan et al. |
| 6,863,944 B2 | | 3/2005 | Naipawer, III et al. |
| 6,881,442 B2 | | 4/2005 | Husemann |
| 6,887,917 B2 | | 5/2005 | Yang et al. |
| 6,895,724 B2 | | 5/2005 | Naipawer, III |
| 6,901,712 B2 | | 6/2005 | Lionel |
| 7,066,371 B2 | | 6/2006 | Villela et al. |
| 7,101,598 B2 | | 9/2006 | Hubbard |
| 7,115,313 B2 | | 10/2006 | Zanchetta et al. |
| 7,132,143 B2 | | 11/2006 | Zanchetta et al. |
| 7,148,160 B2 | | 12/2006 | Porter |
| 7,304,119 B2 | | 12/2007 | Balzer |
| 7,323,242 B2 | | 1/2008 | Gerst et al. |
| 7,358,319 B2 | | 4/2008 | Balzer et al. |
| 7,368,155 B2 | | 5/2008 | Larson et al. |
| 7,473,734 B2 | | 1/2009 | Beckley et al. |
| 7,517,934 B2 | | 4/2009 | Deeter et al. |
| 7,575,653 B2 | | 8/2009 | Johnson et al. |
| 7,589,145 B2 | | 9/2009 | Brant et al. |
| 7,614,194 B2 | | 11/2009 | Shah |
| 7,645,829 B2 | | 1/2010 | Tse et al. |
| 7,744,998 B2 | | 6/2010 | Nakamuta |
| 7,771,807 B2 | | 8/2010 | Hubbard |
| 7,776,417 B2 | | 8/2010 | Mohseen et al. |
| 7,914,868 B2 | | 3/2011 | Naipawer, III et al. |
| 8,063,141 B2 | | 11/2011 | Fisher |
| 8,153,220 B2 | | 4/2012 | Nebesnak et al. |
| 8,202,596 B2 | | 6/2012 | Yang et al. |
| 8,206,817 B2 | | 6/2012 | Donovan et al. |
| 8,241,446 B2 | | 8/2012 | Naipawer, III et al. |
| 8,262,833 B2 | | 9/2012 | Dyal et al. |
| 8,327,594 B2 | | 12/2012 | Merryman et al. |
| 8,329,800 B2 | | 12/2012 | Terrenoire et al. |
| 8,381,450 B2 | | 2/2013 | Cummings et al. |
| 8,389,103 B2 | | 3/2013 | Kiik et al. |
| 8,399,571 B2 | | 3/2013 | Becker et al. |
| 8,492,472 B2 | | 7/2013 | Elizalde et al. |
| 8,530,582 B2 | | 9/2013 | Becker et al. |
| 2003/0032691 A1 | | 2/2003 | Bolte |
| 2003/0215594 A1 | | 11/2003 | Hamdar |
| 2004/0103608 A1 | | 6/2004 | Lionel |
| 2004/0191508 A1 | | 9/2004 | Hubbard |
| 2004/0242763 A1 | | 12/2004 | Tielemans |
| 2005/0214496 A1 | | 9/2005 | Borenstein |
| 2006/0017974 A1 | | 1/2006 | Shapovalov |
| 2006/0100408 A1 | * | 5/2006 | Powell ................. A61K 9/0051 526/320 |
| 2006/0127627 A1 | | 6/2006 | Larson et al. |
| 2006/0216523 A1 | | 9/2006 | Takaki |
| 2007/0207284 A1 | | 9/2007 | McClintic |
| 2007/0281119 A1 | | 12/2007 | Di Stefano |
| 2008/0088056 A1 | | 4/2008 | Vavra |
| 2010/0086712 A1 | | 4/2010 | Moller |
| 2010/0279049 A1 | | 11/2010 | Hubbard |
| 2010/0292403 A1 | | 11/2010 | Ansems |
| 2011/0017391 A1 | | 1/2011 | Yamamoto et al. |
| 2011/0048513 A1 | | 3/2011 | Booth |
| 2012/0240996 A1 | | 9/2012 | Keiser |
| 2013/0012287 A1 | | 1/2013 | Al Ani |
| 2013/0122287 A1 | * | 5/2013 | Moeller ................. C08G 18/12 428/339 |
| 2013/0184393 A1 | * | 7/2013 | Satrijo ................... C08L 33/04 524/502 |
| 2013/0225020 A1 | | 8/2013 | Flood |
| 2017/0114543 A1 | | 4/2017 | Tang et al. |

FOREIGN PATENT DOCUMENTS

| | | |
|---|---|---|
| GB | 2305667 A | 4/1997 |
| WO | 199856866 A1 | 12/1998 |
| WO | 2013142562 A2 | 9/2013 |
| WO | 2015134889 A1 | 9/2015 |
| WO | 2017049280 A1 | 3/2017 |
| WO | 2017165868 A1 | 9/2017 |

(56) References Cited

FOREIGN PATENT DOCUMENTS

| WO | 2017165870 A1 | 9/2017 |
| WO | 2017165871 A1 | 9/2017 |

\* cited by examiner

PEEL AND STICK ROOFING MEMBRANES WITH CURED PRESSURE-SENSITIVE ADHESIVES

This application is a continuation application of U.S. Non-Provisional application Ser. No. 15/398,868 filed on Jan. 5, 2017, which is a divisional of application of U.S. Non-Provisional application Ser. No. 15/021,787, filed on Mar. 14, 2016, which is a National-Stage Application of International Application Serial No. PCT/US14/56295, filed on Sep. 18, 2014, which claims the benefit of U.S. Provisional Application Ser. No. 61/983,738, filed on Apr. 24, 2014, and U.S. Provisional Application Ser. No. 61/879,358, filed on Sep. 18, 2013, all of which are incorporated herein by reference.

FIELD OF THE INVENTION

Embodiments of the invention are directed toward roofing membranes that carry a cured pressure-sensitive adhesive for securing the membrane to a roof surface. The pressure-sensitive adhesive is advantageously applied to the membrane as a hot-melt adhesive and subsequently cured. A release member can be applied to the pressure-sensitive adhesive, thereby allowing the membrane to be rolled, delivered to a job site, and ultimately applied to a roofing surface by using peel and stick techniques.

BACKGROUND OF THE INVENTION

Large, flexible polymeric sheets, which are often referred to as membranes or panels, are used in the construction industry to cover flat or low-sloped roofs. These membranes provide protection to the roof from the environment, particularly in the form of a waterproof barrier. As is known in the art, commercially popular membranes include thermoset membranes such as those including cured EPDM (i.e., ethylene-propylene-diene terpolymer rubber) or thermoplastics such as TPO (i.e., thermoplastic olefins).

These membranes are typically delivered to a construction site in a bundled roll, transferred to the roof, and then unrolled and positioned. The sheets are then affixed to the building structure by employing varying techniques such as mechanical fastening, ballasting, and/or adhesively adhering the membrane to the roof. The roof substrate to which the membrane is secured may be one of a variety of materials depending on the installation site and structural concerns. For example, the surface may be a concrete, metal, or wood deck, it may include insulation or recover board, and/or it may include an existing membrane.

In addition to securing the membrane to the roof—which mode of attachment primarily seeks to prevent wind uplift—the individual membrane panels, together with flashing and other accessories, are positioned and adjoined to achieve a waterproof barrier on the roof. Typically, the edges of adjoining panels are overlapped, and these overlapping portions are adjoined to one another through a number of methods depending upon the membrane materials and exterior conditions. One approach involves providing adhesives or adhesive tapes between the overlapping portions, thereby creating a water resistant seal.

With respect to the former mode of attachment, which involves securing the membrane to the roof, the use of adhesives allow for the formation of a fully-adhered roofing system. In other words, a majority, if not all, of the membrane panel is secured to the roof substrate, as opposed to mechanical attachment methods that can only achieve direct attachment in those locations where a mechanical fastener actually affixes the membrane.

When adhesively securing a membrane to a roof, such as in the formation of a fully-adhered system, there are a few common methods employed. The first is known as contact bonding whereby technicians coat both the membrane and the substrate with an adhesive, and then mate the membrane to the substrate while the adhesive is only partially set. Because the volatile components (e.g. solvent) of the adhesives are flashed off prior to mating, good early (green) bond strength is developed.

Another mode of attachment is through the use of a pre-applied adhesive to the bottom surface of the membrane. In other words, prior to delivery of the membrane to the job site, an adhesive is applied to the bottom surface of the membrane. In order to allow the membrane to be rolled and shipped, a release film or member is applied to the surface of the adhesive. During installation of the membrane, the release member is removed, thereby exposing the pressure-sensitive adhesive, and the membrane can then be secured to the roofing surface without the need for the application of additional adhesives.

As is known in the art, the pre-applied adhesive can be applied to the surface of the membrane in the form of a hot-melt adhesive. For example, U.S. Publication No. 2004/0191508, which teaches peel and stick thermoplastic membranes, employs pressure-sensitive adhesive compositions comprising styrene-ethylene-butylene-styrene (SEBS), tackifying endblock resins such as cumarone-indene resin and tackifying midblock resins such as terpene resins. This publication also suggests other hot-melt adhesives such as butyl-based adhesives, EPDM-based adhesives, acrylic adhesives, styrene-butadiene adhesives, polyisobutylene adhesives, and ethylene vinyl acetate adhesives.

In view of the nature of the adhesives, peel and stick membranes have inherent limitations. For example, there are temperature windows that limit the minimum temperature at which the membranes can be installed on a roof surface. Also, there are maximum temperature limits on the roof surface that the adhesive can withstand while maintaining wind-uplift integrity. With respect to the latter, where the surface temperature on the roof nears the glass transition temperature of the adhesive, the adhesive strength offered by the pressure-sensitive adhesive is not maintained. As a result, peel-and-stick membranes have not gained wide acceptance in the industry. Moreover, the use of peel-and-stick membranes has been limited to use in conjunction with white membranes (e.g., white thermoplastic membranes) because the surface temperature of these membranes remains cooler when exposed to solar energy.

SUMMARY OF THE INVENTION

Embodiments of the present invention provide a membrane composite comprising a polymeric membrane panel, an adhesive layer, and a release member, where the adhesive layer is a pressure-sensitive adhesive that is at least partially cured, and where the adhesive layer has a thickness of at least 102 µm.

Embodiments of the present invention provide a process for forming a membrane composite, the process comprising heating a melt-extrudable, UV-curable pressure-sensitive adhesive to allow the adhesive to flow, applying the adhesive to a planar surface of a membrane panel to form a coating of adhesive, subjecting the coating of the adhesive to UV radiation to thereby effect crosslinking of the adhesive, applying a release member to the adhesive coating to form a composite, and winding the composite.

DETAILED DESCRIPTION OF ILLUSTRATIVE EMBODIMENTS

Embodiments of the invention are based, at least in part, on the discovery of roofing membranes having a pre-applied pressure-sensitive adhesive that is at least partially cured. In one or more embodiments, the pre-applied adhesive is applied as a hot-melt adhesive and subsequently cured. While the prior art contemplates thermoplastic membranes that carry a pressure-sensitive adhesive applied to the membrane as a hot-melt adhesive, the hot-melt adhesives used in the present invention are advantageously cured, which provides the membranes with a higher operating temperature. Further, practice of the present invention allows for adjustments in the formulation to achieve greater tack at lower temperatures. Still further, practice of the present invention is not limited to white membranes.

Membrane Construction

Practice of the present invention does not necessarily change the overall construction of the membranes of the present invention. As the skilled person understands, membranes that carry an adhesive for application by peel-and-stick methods are generally known as disclosed in U.S. Publication No. 2004/0191508, which is incorporated herein by reference.

Figure 1:
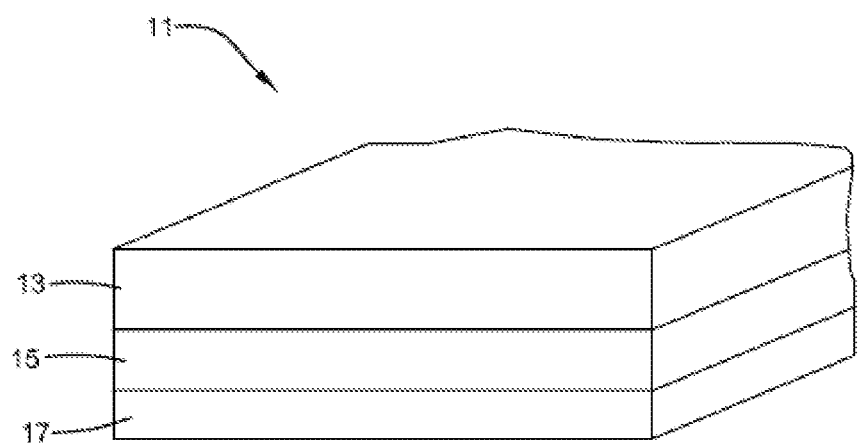
FIG. 1 is a cross-section perspective view of a membrane composite according to embodiments of the invention.

For example, a membrane 11, which may be referred to as a membrane composite 11, is shown in FIG. 1. Membrane composite 11 includes polymeric panel 13, pressure-sensitive adhesive layer 15, and release member 17 removably attached to layer 15.

Membrane Panel

In one or more embodiments, the membrane may be a thermoset material. In other embodiments the membrane may be a thermoformable material. In one or more embodiments, the membrane may be EPDM based. In other embodiments, the membrane may be TPO based. In these or other embodiments, the membrane may be flexible and capable of being rolled up for shipment. In these or other embodiments, the membrane may include fiber reinforcement, such as a scrim. In one or more embodiments, the membrane includes EPDM membranes including those that meet the specifications of the ASTM D-4637. In other embodiments, the membrane includes thermoplastic membranes including those that meet the specifications of ASTM D-6878-03. Still other membranes may include PVC, TPV, CSPE, and asphalt-based membranes.

In one or more embodiments, the roofing membrane panels are characterized by conventional dimensions. For example, in one or more embodiments, the membrane panels may have a thickness of from about 500 μm to about 3 mm, in other embodiments from about 1,000 μm to about 2.5 mm, and in other embodiments from about 1,500 μm to about 2 mm. In these or other embodiments, the membrane panels of the present invention are characterized by a width of about 1 m to about 20 m, in other embodiments from about 2 m to about 18 m, and in other embodiments from about 3 m to about 15 m.

Hot-Melt Curable Adhesives

In one or more embodiments, the curable hot-melt adhesive that may be used for forming the cured pressure-sensitive adhesive layer may be an acrylic-based hot-melt adhesive. In one or more embodiments, the adhesive is a polyacrylate such as a polyacrylate elastomer. In one or more embodiments, useful polyacrylates include one or more units defined by the formula:

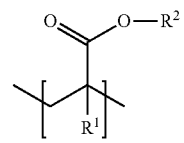

where each R1 is individually hydrogen or a hydrocarbyl group and each R2 is individually a hydrocarbyl group. In the case of a homopolymer, each R1 and R2, respectively, throughout the polymer are same in each unit. In the case of a copolymer, at least two different R1 and/or two different R2 are present in the polymer chain.

In one or more embodiments, hydrocarbyl groups include, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms. In particular embodiments, each R2 is an alkyl group having at least 4 carbon atoms. In particular embodiments, R1 is hydrogen and R2 is selected from the group consisting of butyl, 2-ethylhexyl, and mixtures thereof.

In one or more embodiments, the polyacrylate elastomers that are useful as adhesives in the practice of this invention may be characterized by a glass transition temperature (Tg) of less than 0° C., in other embodiments less than –20° C., in other embodiments less than –30° C. In these or other embodiments, useful polyacrylates may be characterized by a Tg of from about –70 to about 0° C., in other embodiments from about –50 to about –10° C., and in other embodiments from about –40 to about –20° C.

In one or more embodiments, the polyacrylate elastomers that are useful as adhesives in the practice of this invention may be characterized by a number average molecular weight of from about 100 to about 350 kg/mole, in other embodiments from about 150 to about 270 kg/mole, and in other embodiments from about 180 to about 250 kg/mole.

In one or more embodiments, the polyacrylate elastomers that are useful as adhesives in the practice of this invention may be characterized by a Brookfield viscosity at 150° C. of from about 20,000 to about 70,000 cps, in other embodiments from about 30,000 to about 60,000 cps, and in other embodiments from about 40,000 to about 50,000 cps.

Specific examples of polyacrylate elastomers that are useful as adhesives in the practice of the present invention include poly(butylacrylate), and poly(2-ethylhexylacryalte). These polyacrylate elastomers may be formulated with photoinitiators, solvents, plasticizers, and resins such as natural and hydrocarbon resins. The skilled person can readily formulate a desirable coating composition. Useful coating compositions are disclosed, for example, in U.S. Pat. Nos. 6,720,399, 6,753,079, 6,831,114, 6,881,442, and 6,887,917, which are incorporated herein by reference.

In other embodiments, the polyacrylate elastomers may include polymerized units that serve as photoinitiators. These units may derive from copolymerizable photoinitiators including acetophenone or benzophenone derivatives. These polyacrylate elastomers and the coating compositions formed therefrom are known as disclosed in U.S. Pat. Nos. 7,304,119 and 7,358,319, which are incorporated herein by reference.

Useful adhesive compositions are commercially available in the art. For example, useful adhesives include those available under the tradename acResin (BASF), those available under the tradename AroCure (Ashland Chemical), and NovaMeltRC (NovaMelt). In one or more embodiments, these hot-melt adhesives may be cured (i.e., crosslinked) by UV light.

In one or more embodiments, the hot-melt adhesive is at least partially cured after being applied to the membrane, as will be discussed in greater detail below. In one or more embodiments, the adhesive is cured to an extent that it is not thermally processable in the form it was prior to cure. In these or other embodiments, the cured adhesive is characterized by a cross-linked infinite polymer network. While at least partially cured, the adhesive layer of one or more embodiments is essentially free of curative residue such as sulfur or sulfur crosslinks and/or phenolic compounds or phenolic-residue crosslinks.

In one or more embodiments, the pressure-sensitive adhesive layer may have a thickness of at least 51 µm (2 mil), in other embodiments at least 102 µm (4 mil), in other embodiments at least 127 µm (5 mil), and in other embodiments at least 152 µm (6 mil). In these or other embodiments, the pressure-sensitive adhesive layer has a thickness of at most 381 µm (15 mil), in other embodiments at most 305 µm (12 mil), and in other embodiments at most 254 µm (10 mil). In one or more embodiments, the adhesive layer has a thickness of from about 51 to about 381 µm (about 2 to about 15 mil), in other embodiments from about 102 to about 305 µm (about 4 to about 12 mil), and in other embodiments from about 127 to about 254 µm (about 5 to about 10 mil).

Release Member

In one or more embodiments, release member 17 may include a polymeric film or extrudate, or in other embodiments it may include a cellulosic substrate. Where the polymeric film and/or cellulosic substrate cannot be readily removed after being attached to the asphaltic component, the polymeric film and/or cellulosic substrate can carry a coating or layer that allows the polymeric film and/or cellulosic substrate to be readily removed from the asphaltic component after attachment. This polymeric film or extrudate may include a single polymeric layer or may include two or more polymeric layers laminated or coextruded to one another.

Suitable materials for forming a release member that is a polymeric film or extrudate include polypropylene, polyester, high-density polyethylene, medium-density polyethylene, low-density polyethylene, polystyrene or high-impact polystyrene. The coating or layer applied to the film and/or cellulosic substrate may include a silicon-containing or fluorine-containing coating. For example, a silicone oil or polysiloxane may be applied as a coating. In other embodiments, hydrocarbon waxes may be applied as a coating. As the skilled person will appreciate, the coating, which may be referred to as a release coating, can be applied to both planar surfaces of the film and/or cellulosic substrate. In other embodiments, the release coating need only be applied to the planar surface of the film and/or cellulosic substrate that is ultimately removably mated with the asphaltic component.

In one or more embodiments, the release member is characterized by a thickness of from about 15 to about 80, in other embodiments from about 18 to about 75, and in other embodiments from about 20 to about 50 µm.

Preparation of Membrane Composite

The membrane panels employed in the membrane composites of the present invention may be prepared by conventional techniques. For example, thermoplastic membrane panels may be formed by the extrusion of thermoplastic compositions into one or more layers that can be laminated into a membrane panel. Thermoset membranes can be formed using known calendering and curing techniques. Alternatively, thermoset membranes can be made by continuous process such as those disclosed in WO 2013/142562, which is incorporated herein by reference. Once the membrane is formed, the curable hot-melt adhesive can be extruded onto the membrane by using known apparatus such as adhesive coaters. The adhesive can then subsequently be cured by using, for example, UV radiation. The release film can be applied to the adhesive layer, and the membrane can then be subsequently rolled for storage and/or shipment. Advantageously, where the membrane panel is made by using continuous techniques, the process can be supplemented with continuous techniques for applying and curing the adhesive coatings according to embodiments of the present invention to thereby prepare usable membrane composites within a single continuous process.

Figure 2:
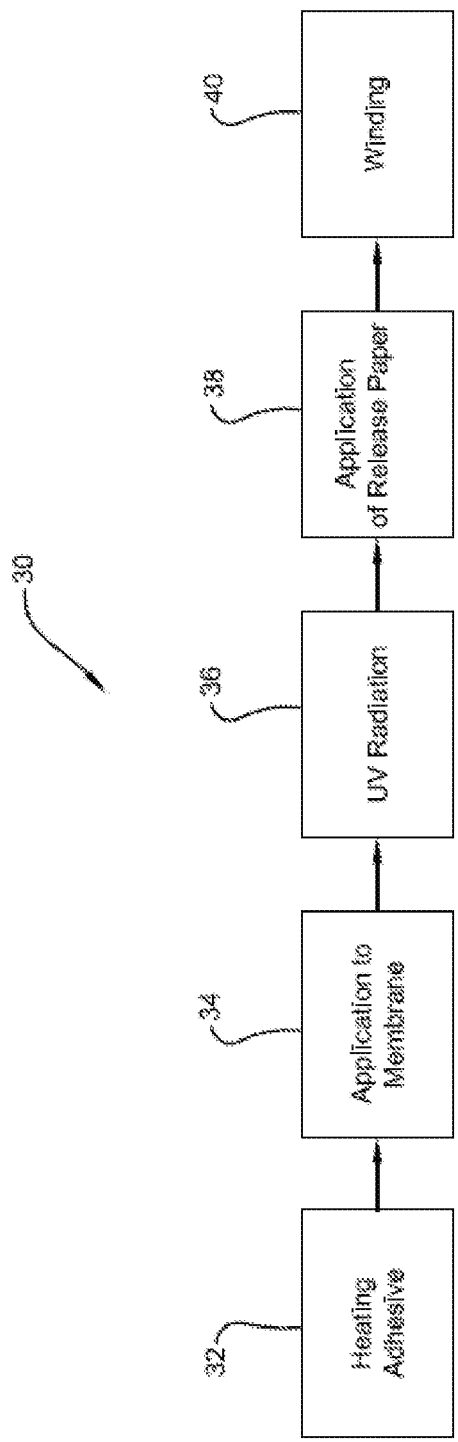
FIG. 2 is a flow chart describing a process for making membrane composite according to embodiments of the present invention.

As generally shown in FIG. 2, process 30 for preparing a composite membrane according to the present invention generally begins with a step of heating 32, wherein a pressure-sensitive adhesive is heated to a sufficient temperature to allow the adhesive to be applied as a coating within a coating step 34. Within coating step 34, the adhesive is applied to the membrane to form a coating layer. Following formation of the coating, the coating is subjected to a UV-curing step 36 where sufficient UV energy is applied to the coating to thereby effect a desirable curing or crosslinking of the adhesive. Once the adhesive has been sufficiently cured by exposure to UV curing step 36, a release member can be applied to the cured coating in a member application step 38. Following application of a member, the composite is wound into a roll at winding step 40.

In one or more embodiments, heating step 32 heats the adhesive to a temperature of from about 120 to about 160° C., in other embodiments from about 125 to about 155° C., and in other embodiments from about 130 to about 150° C.

In one or more embodiments, coating step 34 applies an adhesive to the surface of a membrane to form a coating layer of adhesive that has a thickness of at least 51 µm (2 mil), in other embodiments at least 102 µm (4 mil), in other embodiments at least 127 µm (5 mil), and in other embodiments at least 152 µm (6 mil). In one or more embodiments, coating step 34 applies an adhesive to the surface of a membrane to form a coating layer of adhesive that has a thickness of from about 51 to about 381 µm (about 2 to about 15 mil), in other embodiments from about 102 to about 305 µm (about 4 to about 12 mil), and in other embodiments from about 127 to about 254 µm (about 5 to about 10 mil). In one or more embodiments, the coating has a uniform thickness such that the thickness of the coating at any given point on the surface of the membrane does not vary by more than 51 µm (2 mil), in other embodiments by more than 38 µm (1.5 mil), and in other embodiments by more than 25 µm (1 mil).

In one or more embodiments, UV curing step 36 subjects the adhesive coating to a UV dosage of from about 30 to about 380 millijoule/cm2, in other embodiments from about 35 to about 300 millijoule/cm2, in other embodiments from about 40 to about 280 millijoule/cm2, in other embodiments from about 45 to about 240 millijoule/cm2, and in other embodiments from about 48 to about 235 millijoule/cm2. It has advantageously been discovered that the required dosage of energy can be exceeded without having a deleterious impact on the adhesives of the present invention. For example, up to ten times, in other embodiments up to five times, and in other embodiments up to three times the required dosage can be applied to the coating composition without having a deleterious impact on the coating composition and/or its use in the present invention.

In one or more embodiments, UV curing step 36 subjects the adhesive coating to a UV intensity, which may also be referred to as UV irradiance, of at least 150, in other embodiments at least 200, and in other embodiments at least 250 milliWatts/cm2. In these or other embodiments, UV curing step 36 subjects the adhesive coating to a UV intensity of from about 150 to about 500 milliWatts/cm2, in other embodiments from about 200 to about 400 milliWatts/cm2, and in other embodiments from about 250 to about 350 milliWatts/cm2. It has advantageously been discovered that the ability to appropriately cure the coating compositions of the present invention, and thereby provide a useful pressure-sensitive adhesive for the roofing applications disclosed herein, critically relies on the UV intensity applied to the coating. It is believed that the thickness of the coatings (and therefore the thickness of the pressure-sensitive adhesive layer) employed in the present invention necessitates the application of greater UV intensity.

In one or more embodiments, the energy supplied to the coating layer within UV radiation step 36 is in the form of UV-C electromagnetic radiation, which can be characterized by a wave length of from about 250 to about 260 nm. In one or more embodiments, the UV dosage applied during UV curing step 36 is regulated based upon a UV measuring and control system that operates in conjunction with UV curing step 36. According to this system, UV measurements are taken proximate to the surface of the adhesive coating layer using known equipment such as a UV radiometer. The data from these measurements can be automatically inputted into a central processing system that can process the information relative to desired dosage and/or cure states and automatically send signal to various variable-control systems that can manipulate one or more process parameters. For example, the power supplied to the UV lamps and/or the height at which the UV lamps are positioned above the coating layer can be manipulated automatically based upon electronic signal from the central processing unit. In other words, the UV intensity, and therefore the UV dosage, can be adjusted in real time during the manufacturing process.

In one or more embodiments, an exemplary process for preparing the membrane composites of the present invention can be described with reference to FIG. 3. Continuous process 50 includes a heating step 52 where UV curable hot-melt adhesive 51 is heated to a desired temperature within a heated tank 53. Adhesive 51 is fed into an extrusion device, such as a coater 55, which may include a pump, such as a gear pump 57, and a slot die 59. Within coating step 54, coater 55 extrudes adhesive 51, which is in its molten, liquid or flowable state, and deposits a coating layer 61 of adhesive 51 onto a planar surface 63 of membrane 65.

Figure 3:
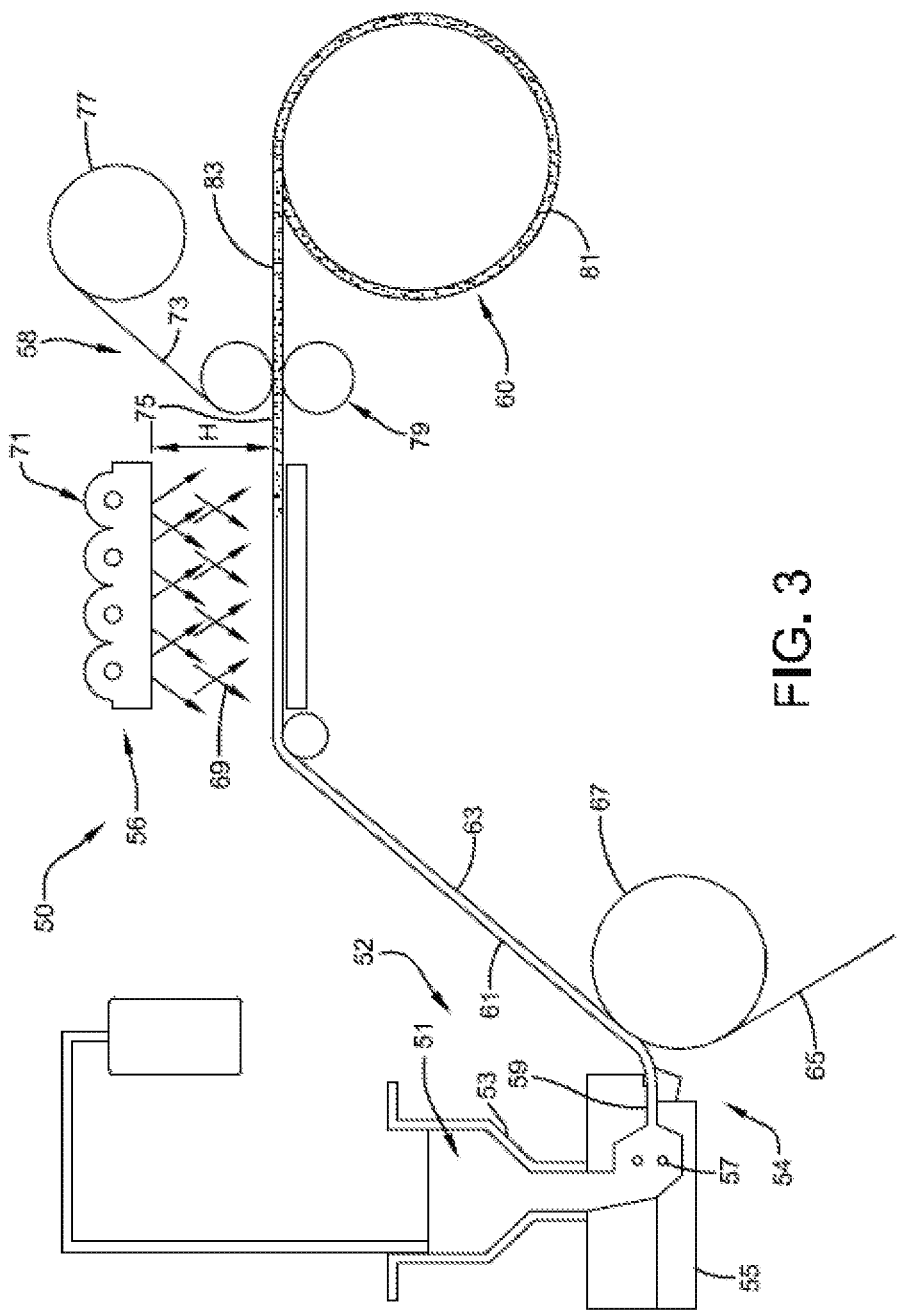
FIG. 3 is a schematic of a continuous process for making membrane composite according to the present invention.

As shown in FIG. 3, coating step 54 can include a roll-coating operation, where adhesive 51 is applied to membrane 65 while membrane 65 is at least partially wound around a coating mandrel 67. Membrane 65 carrying coating layer 61 is fed to a crosslinking step 56, where coating layer 61 of adhesive 51 is subjected to a desired dosage of UV radiation 69, which may be supplied by one or more UV lamps 71. UV lamps 71 may include, for example, mercury-type UV lamps or LED UV lamps. As the skilled person appreciates, the desired dosage of UV energy can be supplied to coating 61 by adjusting the UV intensity and exposure time. The intensity can be manipulated by the power supplied to the respective lamps and the height (H) that the lamps are placed above the surface of coating 61 of adhesive 51. Exposure time can be manipulated based upon the line speed (i.e., the speed at which membrane 65 carrying coating layer 61 is passed through UV curing step 56).

Following UV curing step 56, release paper 73 may be applied to upper surface 75 of coating layer 61 within release paper application step 58. As shown in FIG. 3, release paper 73 may be supplied from a mandrel 77 and removably mated to upper surface 75 through pressure supplied by nip rolls 79. After application of release paper 73, the composite product may be wound within winding step 60 to provide wound rolls 81 of composite products 83.

Characteristics of Composite Membrane

In one or more embodiments, the layer of crosslinked pressure-sensitive adhesive disposed on a surface of the membrane according to the present invention may be characterized by an advantageous peel strength. In one or more embodiments, the peel strength of the layer of crosslinked pressure-sensitive adhesive disposed on the membranes of the present invention may be characterized by a peel strength, as determined according to Pressure Sensitive Tape Council (PSTC) 101, of at least 3.0, in other embodiments at least 3.5, and in other embodiments at least 4.0. In these or other embodiments, the peel strength may be from about 3.0 to about 25 in other embodiments from about 3.5 to about 20, and in other embodiments from about 4.0 to about 18 psi.

In one or more embodiments, the layer of crosslinked pressure-sensitive adhesive disposed on a surface of the membrane according to the present invention may be characterized by an advantageous dead load shear. In one or more embodiments, the dead load shear of the layer of crosslinked pressure-sensitive adhesive disposed on the membranes of the present invention may be characterized by a dead load shear, as determined according to PSTC 107, of at least 0.5 hour (time of failure), in other embodiments at least 1.0 hour, and in other embodiments at least 1.5. In these or other embodiments, the dead load shear may be from about 2.0 to about 2.5 hours.

Application to a Roof Surface

The membrane composites of the present invention can advantageously be applied to a roof surface (also known as roof substrate) by using standard peel and stick techniques. For example, the membrane can be unrolled on a roof surface and placed into position. Portions of the membrane are then typically folded back and portions of the release member are removed. The membrane can then subsequently be adhered to the roof surface by using various techniques including the use of rollers and the like to mate the adhesive to the substrate. Where multiple membrane panels are employed, the seams can be secured by using conventional techniques. For example, thermoplastic membranes can be wielded together at the seam. Where thermoset membranes are employed, either liquid adhesives or tapes can be used to form a seam. It has advantageously been discovered that the pressure-sensitive adhesive layer employed in the membranes of the present invention allows the membranes to be adhered to a variety of roofing surfaces. These include, but are not limited to, wood decks, concrete decks, steel decks, faced construction boards, and existing membrane surfaces. In particular embodiments, the membranes of the present invention are adhered, through the cured adhesive layer disclosed herein, to a faced construction board such as, but not limited to, polyisocyanurate insulation boards or cover boards that include facers prepared from polar materials. For example, the adhesives of the present invention provide advantageous adhesion to facers that contain cellulosic materials and/or glass materials. It is believed that the polar nature of the adhesive is highly compatible with the polar nature of these facer materials and/or any adhesives or coatings that may be carried by glass or paper facers. Accordingly, embodiments of the present invention are directed toward a roof deck including a construction board having a cellulosic or glass facer and a membrane secured to the construction board through an at least partially cured polyacrylate adhesive layer in contact with a glass or cellulosic facer of the construction board.

In order to demonstrate the practice of the present invention, the following examples have been prepared and tested. The examples should not, however, be viewed as limiting the scope of the invention. The claims will serve to define the invention.

Examples

In order to demonstrate the practice of the present invention, a 60 mil (1.5 mm) EPDM membrane was coated with a UV-curable, melt-extrudable polyacrylate adhesive (ac Resin A-250 UV™ from BASF), and was subsequently cured by UV radiation. The membrane was then secured to a stainless steel panel, and the test specimen was then subjected to peel strength testing according to PSTC 101 and dead load shear testing according to PSTC 107. The table below provides the coating thickness, the UV intensity applied to the sample, the UV dose applied to the sample, and the results of the peel and shear testing.

| Samples | 1 | 2 | 3 |
|---|---|---|---|
| Adhesive Thickness (mil) | 6.0 | 6.0 | 6.0 |
| UV Intensity (mW/cm$^2$) | 105 | 276 | 276 |
| UV Dose (mJ/cm$^2$) | 60 | 60 | 235 |
| Peel Strenght (pli) | 159.1 | 111.7 | 87.5 |
| Shear (Hr) | 0.5 | 10.0 | 9.1 |

The data not only demonstrates the usefulness of the present invention, but also highlights the advantages associated with curing the adhesive with higher UV intensity. Also, the data shows that increased dosages of UV energy can be applied without deleteriously impacting the adhesive.

Various modifications and alterations that do not depart from the scope and spirit of this invention will become apparent to those skilled in the art. This invention is not to be duly limited to the illustrative embodiments set forth herein.

What is claimed is:

1. A process for forming a roofing membrane composite, the process comprising:

heating a melt-extrudable, UV-curable pressure-sensitive adhesive composition to allow the adhesive to flow, where the adhesive composition comprises a polyacrylate elastomer and, optionally, one or more of photoinitiators, solvents, plasticizers, and resins;

applying the adhesive composition to a planar surface of a roofing membrane panel, where the membrane panel is adapted to provide a weatherproof polymeric barrier to a building structure, to thereby form an adhesive layer having a thickness of at least 152 µm;

subjecting the adhesive layer to UV radiation to thereby effect crosslinking of the polyacrylate elastomer to form a cured adhesive layer comprising a cross-linked infinite polymer network;

applying a release member to the cured adhesive layer to form a roofing member composite; and winding the composite.

2. The process of claim 1, where said step of heating heats the adhesive composition to a temperature of from about 120 to about 160° C.

3. The process of claim 1, where said step of subjecting the coating to UV radiation includes subjecting the adhesive layer to a UV dosage of from about 50 to about 230 millijoules/cm2.

4. The process of claim 1, where said step of subjecting the coating to UV radiation includes subjecting the adhesive layer to at least 150 milliWatts/cm2 of UV energy.

5. The process of claim 1, where said step of subjecting the coating to UV radiation includes subjecting the adhesive layer to at least 200 milliWatts/cm2 of UV energy.

6. The process of claim 1, where the polyacrylate elastomer includes one or more units deriving from butyl acrylate or 2-ethylhexyl acrylate.

7. The process of claim 1, where the polyacrylate elastomer has a Tg of less than 0° C.

8. The process of claim 1, where the polyacrylate elastomer includes polymerized units that serve as photoinitiators.

9. The process of claim 1, where the polyacrylate elastomer is characterized by a number average molecular weight of from about 100 to about 350 kg/mol.

10. The process of claim 1, where the polyacrylate elastomer is characterized by a Brookfield viscosity at 150° C. of from about 20,000 to about 70,000 cps.

11. The process of claim 1, where the roofing membrane panel is a thermoplastic or cured rubber membrane.

12. The process of claim 1, where the roofing membrane panel is EPDM.

13. The process of claim 1, where the roofing membrane panel has a width of from about 1 to about 20 meters.

14. The process of claim 1, where the roofing membrane panel has a thickness of from about 500 µm to about 3 mm.

15. The process of claim 1, where the cured adhesive layer is in contact with substantially all of one planar surface of the membrane panel.

16. The process of claim 1, where the membrane composite is characterized by a peel strength, when adhered to a stainless steel panel and tested according to PSTC 101, of at least 3.0 psi.

17. The process of claim 1, where the membrane composite is characterized by a dead load shear, when adhered to a stainless steel panel and tested according to PSTC 107, of at least 0.5 hour.

* * * * *